United States Patent
Baccouche et al.

(10) Patent No.: US 10,583,862 B2
(45) Date of Patent: Mar. 10, 2020

(54) VEHICLE ROOF BOW

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); James Chih Cheng, Troy, MI (US); Arnold Kadiu, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 127 days.

(21) Appl. No.: 15/978,276

(22) Filed: May 14, 2018

(65) Prior Publication Data
US 2019/0344833 A1    Nov. 14, 2019

(51) Int. Cl.
| | | |
|---|---|---|
| B60R 13/07 | (2006.01) | |
| B62D 25/06 | (2006.01) | |
| B62D 25/04 | (2006.01) | |
| B60J 1/00 | (2006.01) | |
| B62D 27/02 | (2006.01) | |

(52) U.S. Cl.
CPC .............. *B62D 25/06* (2013.01); *B60J 1/004* (2013.01); *B62D 25/04* (2013.01); *B62D 27/02* (2013.01)

(58) Field of Classification Search
CPC ...... A63C 9/08; B05C 17/00593; B60J 7/062; B60J 7/1265; B60J 7/061; B60J 7/1291; B60J 7/1204; A01D 2101/00; A01D 34/64; B62D 25/06
USPC ..................................................... 296/180.1
See application file for complete search history.

(56) References Cited

U.S. PATENT DOCUMENTS

| | | | | |
|---|---|---|---|---|
| 2,354,700 A | * | 8/1944 | Pezzano | B60R 19/42 180/21 |
| 4,045,075 A | * | 8/1977 | Pulver | B62D 21/08 280/798 |
| 4,205,872 A | * | 6/1980 | Bollinger | B62D 23/005 280/798 |
| 4,310,194 A | * | 1/1982 | Biller | B60P 3/32 135/88.13 |
| 4,709,956 A | * | 12/1987 | Bowman | B60J 7/102 296/10 |
| 5,213,386 A | * | 5/1993 | Janotik | B62D 23/005 280/785 |
| 5,297,837 A | * | 3/1994 | Burst | B60J 7/1256 296/107.1 |
| 5,673,959 A | * | 10/1997 | Padlo | B60J 7/1265 296/114 |

(Continued)

FOREIGN PATENT DOCUMENTS

EP    1690780 A2    8/2006

OTHER PUBLICATIONS

Gardner, "BMW 7 Series CFRP: corrections and missing details", CompositesWorld, Nov. 15, 2016, https://www.compositesworld.com/blog/post/bmw-7-series-cfrp-corrections-and-missing-details.

*Primary Examiner* — Kiran B Patel
(74) *Attorney, Agent, or Firm* — Vichit Chea; Bejin Bieneman, PLC

(57) ABSTRACT

A vehicle includes first and second roof rails spaced from each other, and a forward member and rearward member connected to each other and each extending from the first roof rail to the second roof rail. The forward member includes a beam and a finger. The finger is on the first roof rail and extends from the beam away from the rearward member.

17 Claims, 3 Drawing Sheets

(56) References Cited

U.S. PATENT DOCUMENTS

| | | | | |
|---|---|---|---|---|
| 5,725,270 | A * | 3/1998 | Fleishman | B62D 35/00 |
| | | | | 180/903 |
| 5,848,853 | A * | 12/1998 | Clenet | B62D 23/005 |
| | | | | 403/272 |
| RE36,748 | E * | 6/2000 | Stephens | 296/100.17 |
| 6,102,472 | A * | 8/2000 | Wallstrom | B62D 25/00 |
| | | | | 296/203.01 |
| 6,957,845 | B2 * | 10/2005 | Rager | B62D 23/005 |
| | | | | 296/146.9 |
| D575,675 | S * | 8/2008 | Williams | D12/87 |
| 7,614,687 | B2 * | 11/2009 | Nakamura | B62D 25/04 |
| | | | | 296/193.05 |
| 8,398,160 | B2 | 3/2013 | Baumann | |
| 8,851,558 | B2 * | 10/2014 | Asaga | B62D 25/00 |
| | | | | 296/203.01 |
| 8,991,900 | B2 | 3/2015 | Yamaji et al. | |
| 9,156,500 | B2 | 10/2015 | Faruque et al. | |
| 9,266,570 | B2 | 2/2016 | Kim et al. | |
| 10,029,736 | B1 * | 7/2018 | Arora | B62D 25/06 |
| 10,040,485 | B1 * | 8/2018 | Stojkovic | B62D 25/07 |
| 10,077,081 | B2 * | 9/2018 | Kuwahara | B62D 25/06 |
| 10,160,500 | B2 * | 12/2018 | Cho | B62D 29/043 |
| 2001/0033096 | A1 * | 10/2001 | Hanyu | B62D 21/15 |
| | | | | 296/203.01 |
| 2004/0104601 | A1 * | 6/2004 | Durand | B62D 23/005 |
| | | | | 296/203.01 |
| 2004/0119322 | A1 * | 6/2004 | Dykman | B60R 13/0218 |
| | | | | 296/210 |
| 2005/0269839 | A1 * | 12/2005 | Losch | B62D 25/06 |
| | | | | 296/210 |
| 2007/0176467 | A1 * | 8/2007 | Watanabe | B62D 25/06 |
| | | | | 296/210 |
| 2009/0250976 | A1 * | 10/2009 | Yang | B62D 31/003 |
| | | | | 296/225 |
| 2012/0104799 | A1 | 5/2012 | Danielson et al. | |
| 2015/0097395 | A1 * | 4/2015 | Faruque | B62D 25/04 |
| | | | | 296/187.12 |
| 2017/0144518 | A1 * | 5/2017 | Remmel | B60J 7/065 |
| 2018/0272841 | A1 * | 9/2018 | Caliskan | B60H 1/245 |

* cited by examiner

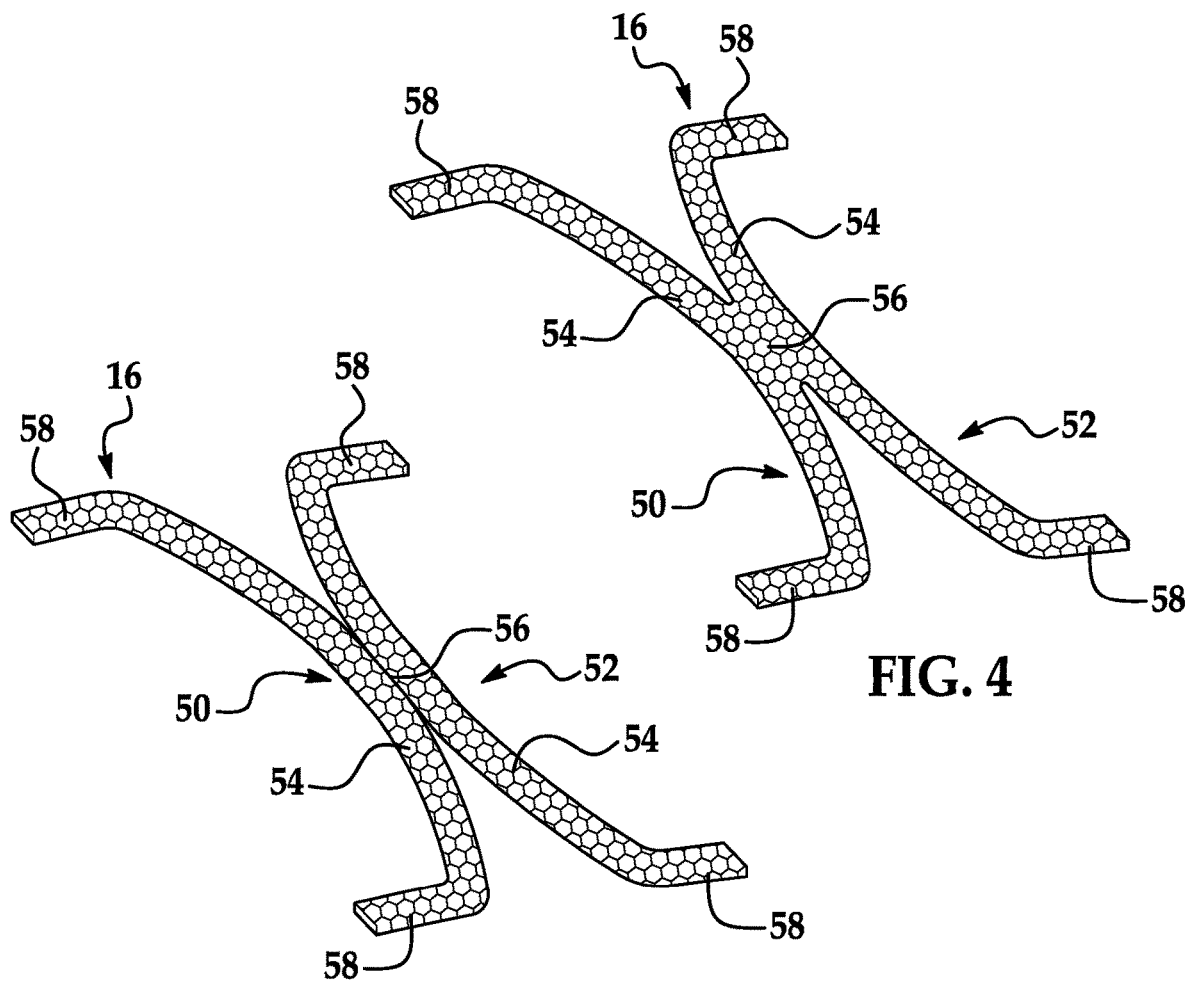
FIG. 4
FIG. 5
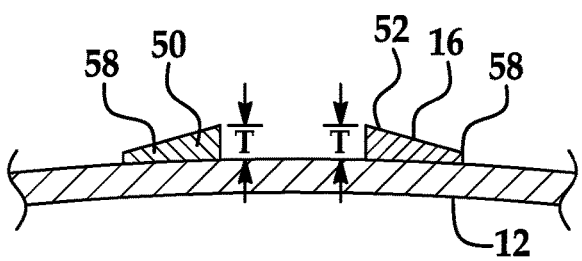
FIG. 6
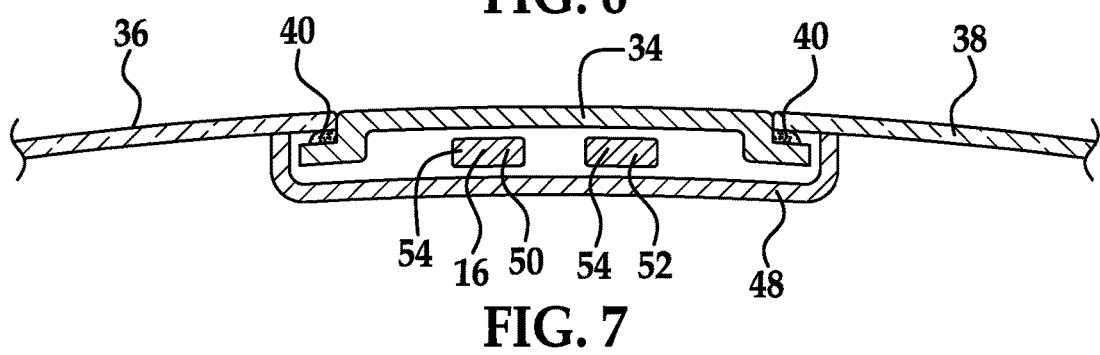
FIG. 7

VEHICLE ROOF BOW

BACKGROUND

A vehicle may include two roof rails spaced from each other and each elongated in a vehicle-longitudinal direction. A plurality of roof bows may extend from one roof rail to the other roof rail. During a side impact of the vehicle, the roof bows may transmit energy from the roof rail on the impacted side to the other roof rail. The plurality roof bows are parallel to each other and are spaced from each other in the vehicle-longitudinal direction to increase the energy transmission between the roof rails during side impact.

A roof panel, which may be metal, may cover the plurality of roof bows to provide an exterior surface over the plurality of roof bows. The roof panel may extend from one roof rail to the other roof rail, and may extend across the plurality of roof bows from a windshield to a backlite of the vehicle and from the A-pillar to the C-pillar.

BRIEF DESCRIPTION OF THE DRAWINGS

FIG. 4 is a perspective view of one embodiment of the roof bow.

FIG. 5 is a perspective view of another embodiment of the roof bow.

FIG. 6 is a cross-sectional view through line 6 in FIG. 2 showing a roof beam and the roof bow supported on the roof beam.

FIG. 7 is a cross-sectional view through line 7 in FIG. 1 showing a windshield and a backlite supported on the roof panel, and a headliner supported on the roof panel.

DETAILED DESCRIPTION

Figure 1:
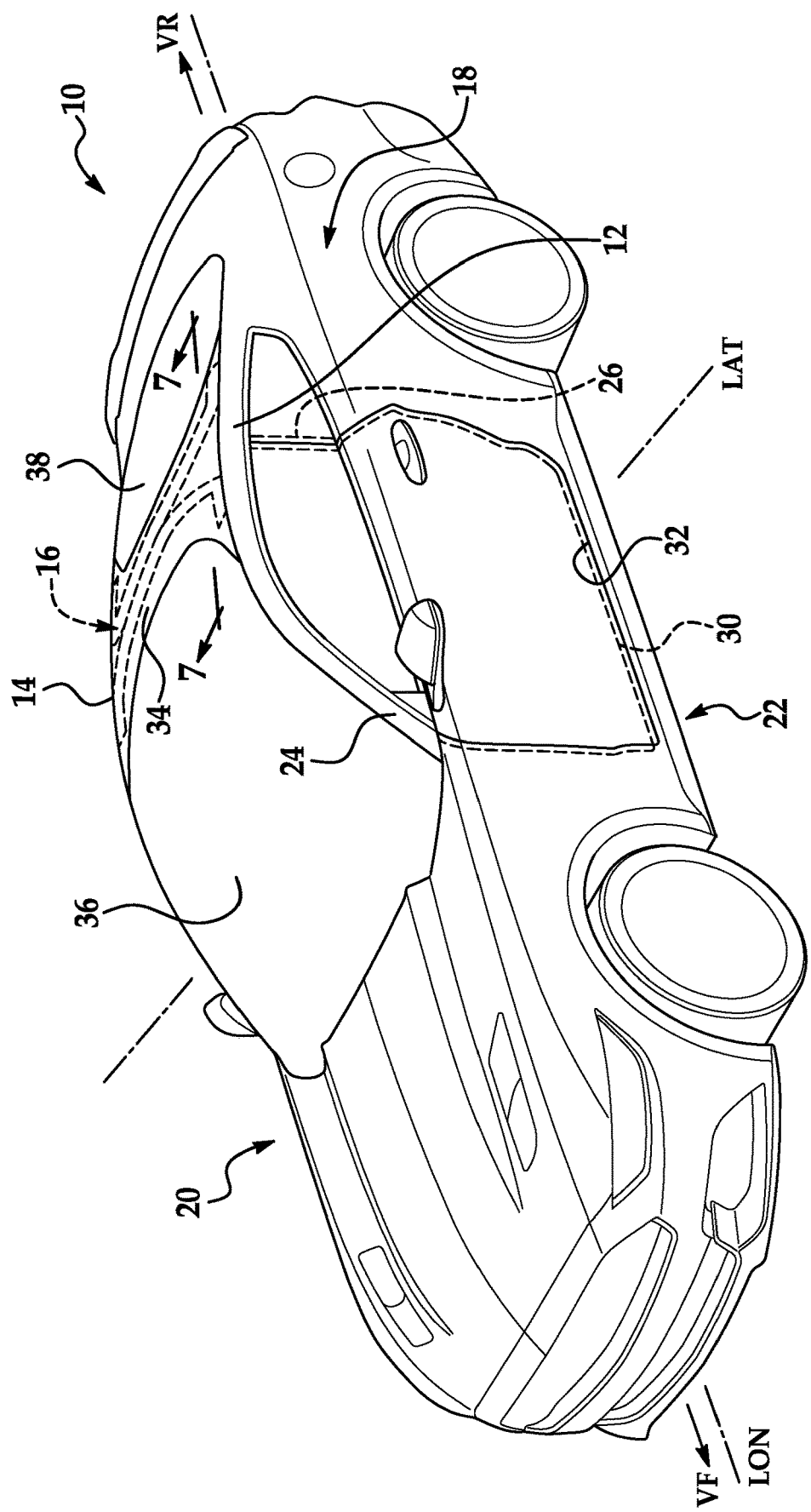
FIG. 1 is a perspective view of a vehicle including a roof bow shown in hidden lines beneath a roof panel.

A vehicle includes first and second roof rails spaced from each other. A forward member and A rearward member are connected to each other and each extend from the first roof rail to the second roof rail. The forward member includes a beam and a finger. The finger is on the first roof rail and extends from the beam away from the rearward member.

The beam may extend from the finger toward the second roof rail.

The forward member may include another finger on the second roof rail extending from the beam away from the rearward member.

The rearward member may include a finger on the first roof rail extending away from the forward member. The rearward member may include another finger on the second roof rail and extending away from the forward member. The beam of the forward member may extend from one finger of the forward member to the other finger of the forward member, and the rearward member may include a beam extending from one finger of the rearward member to the other finger of the rearward member. The beam of the forward member and the beam of the rearward member are connected to each other at midpoints of the forward member and the rearward member. The beam of the forward member and the beam of the rearward member may be connected at a vehicle centerline. The beam of the forward member and the beam of the rearward member may be connected to each other at a connection point, and the beam of the forward member may extend from the connection point in a vehicle-forward direction toward the second roof rail, and the beam of the rearward member may extend from the connection point in a vehicle-rearward direction.

The rearward member may include a finger on the first roof rail and extending away from the forward member.

The forward and rearward members may fork toward the second roof rail.

The rearward member may include a beam that extends from the beam of the forward member toward the second roof rail.

The rearward member may include a beam connected to the beam of the forward member at a connection point, and the beam of the forward member may extend from the connection point in a vehicle-forward direction toward the second roof rail, and the beam of the rearward member may from the connection point in a vehicle-rearward direction.

The thickness of the finger may taper in a direction away from the rearward member along the roof rail.

The forward and rearward members may fork away from each other to the second roof rail, and a pillar may extend from the second rail between the forward and rearward members.

The forward and rearward members may be unitary.

The forward and rearward members may have a lattice structure.

With reference to the Figures, wherein like numerals indicate like parts throughout the several views, a vehicle 10 includes a first roof rail 12 and a second roof rail 14 spaced from each other. The roof rails extend horizontally. A roof bow 16 extends between the first roof rail 12 and the second roof rail 14. As set forth further below, the roof bow 16 distributes forces from the first roof rail 12 to the second roof rail 14 during a side impact of the vehicle 10. The numerical adjectives "first," "second," etc., are used merely as identifiers and are not intended to indicate order or importance.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 10 includes a body 18. The body 18 may be of a unibody construction. As another example, the body 18 may be of a body-on-frame construction (also referred to as a cab-on-frame construction), i.e., the body 18 is a separate component from a frame and is supported on and affixed to the frame. Alternatively, the body 18 may have any suitable construction. The body 18 may be formed of any suitable material, for example, steel, aluminum, fiber-reinforced plastic, etc.

The body 18 includes a first side 20 and a second side 22, i.e., a left side 20 and a right side 22. The first side 20 and the second side 22 may be mirror images of each other or may be different from each other. The first side 20 and the second side 22 are spaced from each other along a lateral axis LAT of the vehicle 10. The vehicle 10 includes a longitudinal axis LON, in other words a vehicle 10 centerline, perpendicular to the lateral axis LAT.

Figure 2:
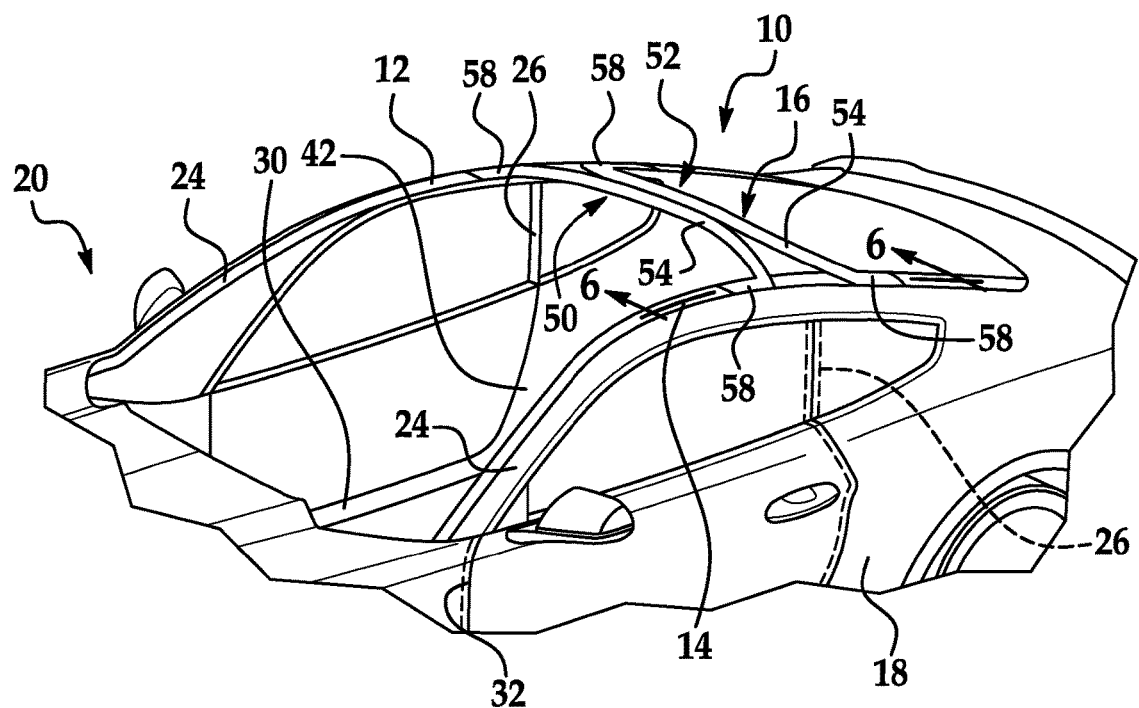
FIG. 2 is a perspective view of a portion of the vehicle with the roof panel removed for illustrative purposes.
Figure 3:
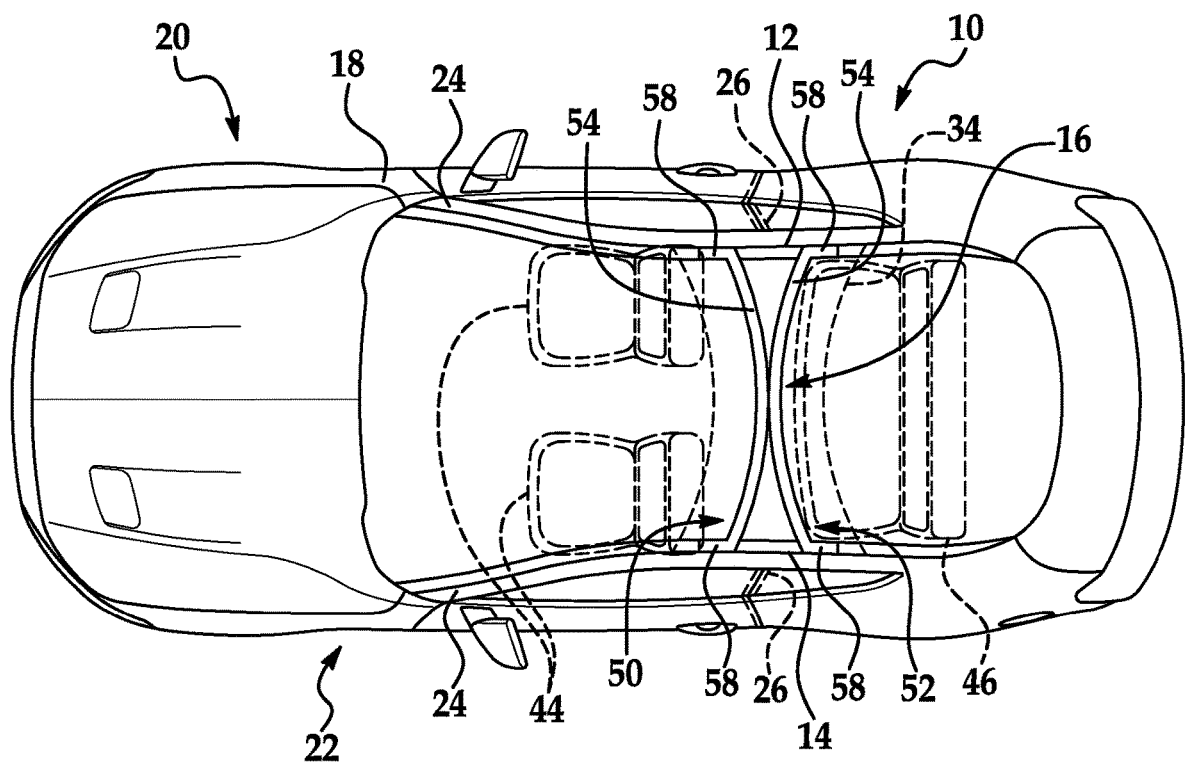
FIG. 3 is a top view of the vehicle with the roof panel shown in phantom for illustrative purposes.

With reference to FIGS. 1-3, the body 18 includes the first roof rail 12 and the second roof rail 14. The first roof rail 12 and the second roof rail 14 are each elongated along the longitudinal direction of the vehicle 10 and are spaced from each other along the lateral axis LAT of the vehicle 10. The first roof rail 12 and the second roof rail 14 are fixed directly to another component of the body 18, e.g., by welding, fusing, bolting, unitary construction, etc.

The body 18 may include a plurality of pillars 24, 26. The first side 20 and the second side 22 of the body 18 may both include pillars. The pillars 24, 26 on the first side 20 and the second side 22 may be mirror images of each other. As an example, the pillars 24, 26 may be positioned as A-pillars 24, B-pillars 26, and C-pillars, etc. In such an example, the pillars may be positioned along the longitudinal axis LON with the A-pillar 24 in a vehicle-forward direction VF with respect to the B-pillar 26, the B-pillar 26 in a vehicle-forward direction VF with the respect to the C-pillar, etc. In other words, in such an example including the A-pillar 24, B-pillar 26, and C-pillar, the B-pillar 26 is between the A-pillar 24 and the C-pillar. The pillars are fixed directly to another component of the body 18, e.g., by welding, fusing, bolting, unitary construction, etc.

The pillars support the first roof rail 12 and the second roof rail 14. Specifically, the body 18 includes floor rails 30, and the pillars may extend from the roof rails to the floor rails 30, respectively.

The body 18 includes door openings 32. As an example, the first side 20 and the second side 22 may each include one door opening 32, as shown in the Figures, or may include more than one door openings 32. The pillars may be disposed on opposite sides of one door opening 32. In other words, the pillars may define at least a portion of each door opening 32. Additionally, the roof rails and floor rails 30 may define at least a portion of each door opening 32. As an example, as shown in the Figures, one door opening 32 may be defined by the A-pillar 24 and the B-pillar 26. As another example, another door opening 32 may be defined by the B-pillar 26 and the C-pillar. With reference to FIG. 1, the body 18 includes a roof panel 34. The roof panel 34 may extend from the first roof rail 12 to the second roof rail 14. In such an example, the roof panel 34 may be connected to the first roof rail 12 and the second roof rail 14 in any suitable fashion, e.g., welding, adhesive, etc. The roof panel 34 may be elongated in the along the lateral axis LAT of the vehicle 10, e.g., from the first roof rail 12 to the second roof rail 14. The roof panel 34 may include an exterior surface that is a class-A surface, i.e., i.e., a surface specifically manufactured to have a high-quality, finished aesthetic appearance free of blemishes. The roof panel 34 may be any suitable material, for example, metal (e.g., aluminum, steel, etc.), polymeric (e.g., fiber reinforced plastic, sheet-molded composite), etc.

The vehicle 10 includes a windshield 36 and a backlite 38. The windshield 36 and the backlite 38 are transparent. The windshield 36 and the backlite 38, for example, may be glass.

The windshield 36 and/or the backlite 38 may be connected to the roof panel 34. For example, the windshield 36 and/or the backlite 38 may be adhered to the roof panel 34 with adhesive 40, as shown in FIG. 7. In such a configuration, the roof panel 34 may include ledges that receive the windshield 36 and the backlite 38, respectively, and the windshield 36 and backlite 38 may be adhered to the ledges, as shown in FIG. 7.

As an example, shown in FIGS. 1 and 7, the windshield 36 and the backlite 38 may both be connected to the roof panel 34, for example, both may be adhered to the roof panel 34 as shown in FIG. 7. In this configuration, the roof panel 34 extends from the windshield 36 to the backlite 38.

The connection of both the windshield 36 and the backlite 38 to the roof panel 34 creates a panoramic view for occupants of the vehicle 10. In other words, this configuration allows for the roof panel 34 to consume a small footprint above an occupant cabin 42 of the vehicle 10, which allows for a greater overhead view through the windshield 36 and the backlite 38. As shown in FIGS. 1-3, the windshield 36 and the backlite 38 may both extend over occupant headspace, i.e., the space in the occupant cabin 42 occupied by an adult occupant seated in an upright position, to create the panoramic view. Specifically, the windshield 36 may extend over occupant headspace above a front row of seats 44, shown in phantom in FIG. 3, and the backlite 38 may extend over occupant headspace above a rear row of seats 46, shown in phantom in FIG. 3.

As shown in FIGS. 2 and 7, the vehicle 10 includes a headliner 48. The headliner 48 extends along the roof panel 34 in the occupant cabin 42. Specifically, the headliner 48 may extend from the first roof rail 12 to the second roof rail 14, and may extend from the windshield 36 to the backlite 38. The headliner 48 may be connected to the first roof rail 12, the second roof rail 14, and/or the roof panel 34.

As shown in FIG. 7, the roof bow 16 may be between the headliner 48 and the roof panel 34. The headliner 48 may provide a class-A surface facing the occupant cabin 42. The headliner 48 may be plastic, foam, leather, vinyl, etc. and combinations thereof.

The roof bow 16 is elongated along the lateral axis LAT. The roof bow 16 connects the first roof rail 12 to the second roof rail 14. For example, as shown in the Figures, the roof bow 16 may extend from the first roof rail 12 to the second roof rail 14. The roof bow 16 may be fixed directly to the body 18, e.g., the first roof rail 12 and the second roof rail 14. For example, the roof bow 16 may be fixed directly to the body 18 by welding, fusing, bolting, unitary construction, etc. As another example, the roof bow 16 may be fixed to the body 18 by an intermediate component in such a way that force may be transmitted by the roof bow 16 from one roof rail 12, 14, to the other roof rail 12, 14.

The roof bow 16 may include a forward member 50 and a rearward member 52. Both the forward member 50 and the rearward member 52 may connect the first roof rail 12 to the second roof rail 14. The forward member 50 and rearward member 52 each extend from the first roof rail 12 to the second roof rail 14. For example, as shown in the Figures, both the forward member 50 and the rearward member 52 may extend from the first roof rail 12 to the second roof rail 14. Both the forward member 50 and the rearward member 52 are fixed directly to the body 18, e.g., the first roof rail 12 and the second roof rail 14. For example, both the forward member 50 and the rearward member 52 may be fixed directly to the body 18 by welding, fusing, bolting, unitary construction, etc.

The roof bow 16 may include a plurality of beams 54. As shown in the figures, the forward member 50 and the rearward member 52 may each include one beam 54. The beam 54 of the rearward member 52 may be a mirror image of the beam 54 of the forward member 50.

The forward member 50 and the rearward member 52 are connected to each other. In one example, the forward member 50 and the rearward member 52, e.g., the beam 54 of the forward member 50 and the beam 54 of the rearward member 52, may be connected to each other at midpoints 56 of the forward member 50 and the rearward member 52. The forward member 50 and the rearward member 52, e.g., the beam 54 of the forward member 50 and the beam 54 of the rearward member 52, may be connected at a vehicle centerline, i.e., a longitudinal centerline of the vehicle 10. The midpoints 56 of the forward member 50 and the rearward member 52 may be at the vehicle centerline.

The forward member 50 and the rearward member 52 may be connected to each other in any suitable fashion. As one example shown in FIG. 4, the forward member 50 and rearward member 52 are unitary, i.e., the combination of the forward member 50 and the rearward member 52 is a single, uniform piece of material with no seams, joints, fasteners, or adhesives holding it together. In such an example, the forward member 50 and the rearward member 52 may be formed as a single unit by additive manufacturing. In the alternative to being unitary, the forward member 50 and the rearward member 52 may be separate components, as shown in FIG. 5, i.e., separately formed and subsequently joined. In such an example, the forward member 50 and the rearward member 52 may be joined by a fastener, adhesive, welding, fusing, etc.

The forward member 50 and rearward member 52, e.g., the beams 54, fork relative to each other. For example, the forward member 50 and rearward member 52 may fork away from each other toward the first roof rail 12. As another example, the forward member 50 and rearward member 52 may fork away from each other toward the second roof rail 14. In the configuration shown in the Figures, the forward member 50 and rearward member 52 may be arranged in an X-shape, i.e., the roof bow 16 is X-shaped.

The forking of the forward member 50 and the rearward member 52 distributes the forces during a side impact. As an example, during a side impact at the first side 20, the roof bow 16 distributes force to the second roof rail 14. Similarly, during a side impact at the second side 22, the roof bow 16 distributes force to the first roof rail 12. Specifically, since the forward member 50 and the rearward member 52 fork, the forces of the impact on the first side 20 are transmitted to the forward member 50 and/or the rearward member 52 at the first roof rail 12 and are distributed to both the forward member 50 and the rearward member 52 at the second roof rail 14 to reduce loading concentration at the second roof rail 14. Similarly, the loading concentration at the first roof rail 12 is reduced during an impact on the second side 22.

The B-pillars 26 may be disposed on the roof beams 54, respectively, between the forward member 50 and the rearward member 52 along the longitudinal axis LON. In other words, the forward member 50 and rearward member 52 are on opposite sides of each B-pillar 26.

The roof bow 16 may include a plurality of fingers 58. For example, the forward member 50 may include one or more fingers 58 and the rearward member 52 may include one or more fingers 58. In the example shown in the Figures, the forward member 50 includes two fingers 58, i.e., one at the first roof rail 12 and another at the second roof rail 14, and the rearward member 52 includes two fingers 58, i.e., one at the first roof rail 12 and another at the second roof rail 14.

The fingers 58 may assist in distributing the force of the side impact. Specifically, when loads are transmitted to the fingers 58, the fingers 58 transmit the load to the respective roof rail. The extension of the fingers 58 along the longitudinal axis LON reduces the loading concentration at the respective roof rail. Specifically, the finger 58 on the forward member 50 extends from the beam 54 in a vehicle-forward direction VF to transmit loads in the vehicle-forward direction VF, and the finger 58 on the rearward member 52 extends from the beam 54 in a vehicle-rearward direction VR to transmit loads in the vehicle-rearward direction VR.

The fingers 58 may be on the roof rails, and the roof rails may support the fingers 58. The fingers 58 are connected to the roof rails. For example, the fingers 58 may be fixed to the roof rails by welding, fusing, bolting, unitary construction, etc. The fingers 58 may be fixed to the roof rails directly, or indirectly through an intermediate component.

With reference to FIGS. 2 and 3, one finger 58 of the forward member 50 is on the first roof rail 12 and extends from the beam 54 away from the rearward member 52 along the longitudinal axis LON in a vehicle-forward direction VF. The other finger 58 of the forward member 50 is on the second roof rail 14 and extends from the beam 54 away from the rearward member 52 along the longitudinal axis LON in a vehicle-forward direction VF.

With continued reference to FIGS. 2 and 3, one of the fingers 58 of the rearward member 52 is on the first roof rail 12 and extends from the beam 54 away from the forward member 50 along the longitudinal axis LON in a vehicle-rearward direction VR. The other finger 58 of the rearward member 52 is on the second roof rail 14 and extends from the beam 54 away from the forward member 50 along the longitudinal axis LON in a vehicle-rearward direction VR.

With reference to FIGS. 2 and 3, the fingers 58 of the forward member 50 extend from the beam 54 of the forward member 50. The beam 54 of the forward member 50 extends from the finger 58 on the first roof rail 12 toward the second roof rail 14, and the beam 54 of the forward member 50 extends from the finger 58 on the second roof rail 14 toward the first roof rail 12. Specifically, the beam 54 of the forward member 50 may extend from one finger 58 of the forward member 50 to the other finger 58 of the forward member 50.

With reference to FIGS. 2 and 3, the fingers 58 of the rearward member 52 extend from the beam 54 of the rearward member 52. The beam 54 of the rearward member 52 extends from the finger 58 on the first roof rail 12 toward the second roof rail 14, and the beam 54 of the rearward member 52 extends from the finger 58 on the second roof rail 14 toward the first roof rail 12. Specifically, the beam 54 of the rearward member 52 may extend from one finger 58 of the rearward member 52 to the other finger 58 of the rearward member 52.

With reference to FIG. 6, the thickness T of the fingers 58 may taper. For example, the thickness T of the fingers 58 extending from the forward member 50 may taper in a direction away from the rearward member 52 along the roof rail. As another example, the thickness T of the fingers 58 extending from the rearward member 52 may taper in a direction away from the forward member 50 along the roof rail. The tapering of the fingers 58 determines the load distribution and concentration at the respective rail. The length and degree of tapering may be designed to manage the distribution of loads to the respective roof rail as desired.

As one example, the roof bow 16 may have a lattice structure. In other words, the material, i.e., at a macroscopic level, of the roof bow 16 may be arranged in a regular, repeated, three-dimensional arrangement pattern of cells. For example, this pattern of cells may have a honeycomb shape. The pattern of cells has voids. As an example, the voids may have a diameter of 5-100 cm. For illustrative purposes the lattice structure 62 is shown only in FIGS. 4 and 5. In FIGS. 4 and 5, the entire roof bow 16 has the lattice structure. Alternatively, portions of the roof bow 16 may have the lattice structure, and other portions of the roof bow 16 may have other configurations, e.g., solid, bio-derived shape, etc. As another example, the roof bow 16 may have any suitable configuration such as any combination of lattice structure, bio-derived shape, solid, etc. The structure, shape, thickness, etc., of the roof bow 16 may be customized to provide force absorption and transmission needed for a specific vehicle design.

The roof bow 16 may be any suitable material, e.g., metal (e.g., aluminum, steel, etc.), polymeric (e.g., fiber reinforced plastic, sheet-molded composite), etc. The material type of the roof bow 16 may be uniform throughout the roof bow 16. Alternatively, components of the roof bow 16, e.g., the forward member 50 and the rearward member 52, may be different.

During a vehicle 10 impact, e.g., a side impact, the roof bow 16 distributes the force of the impact to assist in absorbing the energy of the vehicle 10 impact and reducing intrusion into the occupant cabin 42. As set forth above, since the roof bow 16 extends from the first roof rail 12 to the second roof rail 14, the roof bow 16 reinforces the body 18. For example, when the first side 20 is impacted, the roof bow 16 distributes the forces to the second side 22 such that the second side 22 reinforces the impacted first side 20. Specifically, since the forward member 50 and the rearward member 52 fork, the forces of the impact on the first side 20 are transmitted to the forward member 50 and/or the rearward member 52 at the first roof rail 12 and are distributed to both the forward member 50 and the rearward member 52 at the second roof rail 14 to reduce loading concentration at the second roof rail 14. The load distribution by the forward and rearward members 52 increases the strength of the body 18 during side impact, while allowing for the panoramic view described above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   first and second roof rails spaced from each other; and
   a forward member and rearward member connected to each other and each extending from the first roof rail to the second roof rail; and
   the forward member including a beam and a finger, the finger being on the first roof rail and extending from the beam away from the rearward member.

2. The vehicle as set forth in claim 1, wherein the beam extends from the finger toward the second roof rail.

3. The vehicle as set forth in claim 1, wherein the forward member includes another finger on the second roof rail and extending from the beam away from the rearward member.

4. The vehicle as set forth in claim 3, wherein the rearward member includes a finger on the first roof rail and extending away from the forward member.

5. The vehicle as set forth in claim 4, wherein the rearward member includes another finger on the second roof rail and extending away from the forward member.

6. The vehicle as set forth in claim 5, wherein the beam of the forward member extends from one finger of the forward member to the other finger of the forward member, and wherein the rearward member includes a beam extending from one finger of the rearward member to the other finger of the rearward member.

7. The vehicle as set forth in claim 6, wherein the beam of the forward member and the beam of the rearward member are connected to each other at midpoints of the forward member and the rearward member.

8. The vehicle as set forth in claim 6, wherein the beam of the forward member and the beam of the rearward member are connected at a vehicle centerline.

9. The vehicle as set forth in claim 6, wherein the beam of the forward member and the beam of the rearward member are connected to each other at a connection point, and wherein the beam of the forward member extends from the connection point in a vehicle-forward direction toward the second roof rail, and the beam of the rearward member extends from the connection point in a vehicle-rearward direction.

10. The vehicle as set forth in claim 1, wherein the rearward member includes a finger on the first roof rail and extending away from the forward member.

11. The vehicle as set forth in claim 1, wherein the forward and rearward members fork toward the second roof rail.

12. The vehicle as set forth in claim 1, wherein the rearward member includes a beam that extends from the beam of the forward member toward the second roof rail.

13. The vehicle as set forth in claim 1, wherein the rearward member includes a beam connected to the beam of the forward member at a connection point, and wherein the beam of the forward member extends from the connection point in a vehicle-forward direction toward the second roof rail, and the beam of the rearward member extends from the connection point in a vehicle-rearward direction.

14. The vehicle as set forth in claim 1, wherein the thickness of the finger tapers in a direction away from the rearward member along the roof rail.

15. The vehicle as set forth in claim 1, wherein the forward and rearward members fork away from each other to the second roof rail, and further comprising a pillar extending from the second rail between the forward and rearward members.

16. The vehicle as set forth in claim 1, wherein the forward and rearward members are unitary.

17. The vehicle as set forth in claim 1, wherein the forward and rearward members have a lattice structure.

* * * * *